United States Patent [19]

Osterloh

[11] Patent Number: 5,333,687
[45] Date of Patent: Aug. 2, 1994

[54] LONG CHAIN ALCOHOL ADDITIVES FOR SURFACTANT FOAMING AGENTS

[75] Inventor: William T. Osterloh, Missouri City, Tex.

[73] Assignee: Texaco Inc., White Plains, N.Y.

[21] Appl. No.: 996,265

[22] Filed: Dec. 24, 1992

[51] Int. Cl.$^5$ .................. F21B 43/18; F21B 43/22; F21B 43/24
[52] U.S. Cl. .................. 166/272; 166/268; 166/303; 166/309; 252/8.554
[58] Field of Search ............. 166/268, 272, 273, 274, 166/303, 309; 252/8.554

[56] References Cited

U.S. PATENT DOCUMENTS

| | | | |
|---|---|---|---|
| 3,330,346 | 7/1967 | Jacobs et al. | 166/273 |
| 3,335,792 | 8/1967 | O'Brien et al. | 166/273 |
| 3,410,342 | 11/1968 | Abdo | 166/274 |
| 4,458,759 | 7/1984 | Isaacs et al. | 166/272 |
| 4,572,294 | 2/1986 | Duerksen et al. | 166/273 |
| 4,739,831 | 4/1988 | Settlemeyer et al. | 166/274 |

*Primary Examiner*—George A. Suchfield
*Attorney, Agent, or Firm*—James L. Bailey; Kenneth R. Priem; Harold J. Delhommer

[57] ABSTRACT

The invention is a method for increasing the effectiveness of steam or carbon dioxide foaming operations for improving conformance during steam or carbon dioxide floods by adding to the surfactant foaming solution an alcohol having about 8 to about 20 carbon atoms in a concentration such that the ratio of alcohol to surfactant in the foaming solution is between about 1:6 and about 1:2.

8 Claims, 2 Drawing Sheets

LONG CHAIN ALCOHOL ADDITIVES FOR SURFACTANT FOAMING AGENTS

BACKGROUND OF THE INVENTION

The present invention relates to performance improving additives of long chain alcohols for surfactant foaming solutions which are injected in conjunction with steam or carbon dioxide floods to improve conformance.

When an oil reservoir is subjected to steam injection, steam tends to move up in the formation, whereas condensate and oil tends to move down due to the density difference between the fluids. Gradually, a steam override condition develops, in which the injected steam sweeps the upper portion of the formation but leaves the lower portion untouched. Injected steam will tend to follow the path of least resistance from the injection well to a production well. Thus, areas of high permeability will receive more and more of the injected steam which further raises the permeability of such areas. This phenomenon exists to an even larger degree with low injection rates and thick formations. The steam override problem worsens at greater radial distances from the injection well because steam flux decreases with increasing steam zone radius.

Although residual oil saturation in the steam swept region can be as low as 10%, the average residual oil saturation in the formation remains much higher due to poor vertical conformance. Thus it is because of the creation of steam override zones that vertical conformance in steam floods is usually poor.

A similar conformance problem exists with carbon dioxide flooding. Carbon dioxide has a large tendency to channel through oil in place since carbon dioxide viscosity may be 10 to 50 times lower than the viscosity of the oil in place. This problem of channeling through oil is exacerbated by the inherent tendency of a highly mobile fluid such as carbon dioxide to preferentially flow through more permeable rock sections. These two factors, unfavorable mobility ratios between carbon dioxide and the oil in place and the tendency of carbon dioxide to take advantage of permeability variations, often make carbon dioxide flooding uneconomical. Conformance problems increase as the miscibility of the carbon dioxide with the oil in place decreases.

Although not much attention has been devoted to carbon dioxide conformance, it has long been the concern of the oil industry to improve the conformance of a steam flood by reducing the permeability of the steam swept zone by various means. The injection of numerous chemicals such as foams, foaming solutions, gelling solutions or plugging or precipitating solutions have been tried. Because of the danger of damaging the reservoir, it is considered important to have a non-permanent means of lowering permeability in the steam override zones. For this reason, certain plugging agents are deemed not acceptable. In order to successfully divert steam and improve vertical conformance, the injected chemical should be (1) stable at high steam temperatures of about 300° to about 600° F., (2) effective in reducing permeability in steam swept zones, (3) non-damaging to the oil reservoir and (4) economical.

The literature is replete with references to various foaming agents which are employed to lower permeability in steam swept zones. The vast majority of the foaming agents in the prior art require the injection of a non-condensable gas to generate the foam in conjunction with the injection of steam and the foaming agent. U.S. Pat. Nos. 3,410,344 and 3,994,345 disclose the use of a steam foaming agent selected from the generic groups of polyethoxyalkanols and alkylaryl sulfonates to reduce permeability in steam channels. U.S. Pat. No. 4,018,278 discloses the use of sulfonated, ethoxylated alcohols or alkylphenols in surfactant flooding solutions without the use of steam.

Copending U.S. patent application Ser. No. 896,710, filed Jun. 10, 1992, now U.S. Pat. No. 5,209,367, discloses the use of fatty acids having about 12 to about 20 carbon atoms as additives to surfactant foaming solutions used in steam or carbon dioxide floods where the ratio of fatty acid to surfactant in the foaming solution is between about 1:4 to 3:2. Copending U.S. patent application Ser. No. 964,741 filed Dec. 24, 1992, discloses the use of fatty acid salts as steam foaming agents, and not additives to foaming systems in steam floods. The aqueous solution containing the fatty acid salts must have a pH between about 8 and about 12 and a salinity greater than about 1%.

SUMMARY OF THE INVENTION

The invention is an improvement to surfactant foam injection methods used to improve conformance in steam or carbon dioxide floods. When such foams are used, a surfactant foaming solution is injected to foam within the formation and reduce the permeability of swept and partially swept zones, forcing steam or carbon dioxide into unswept zones. The improvement comprises adding a long chain alcohol having about 8 to about 20 carbon atoms to the surfactant foaming solution in a concentration such that the ratio of alcohol to surfactant in the foaming solution is between about 1:6 and about 1:2.

The invention may be practiced wherever a surfactant foaming solution is employed, such as in a steam or carbon dioxide drive flood to production wells or in a cyclic flood involving injection and production through the same well.

DETAILED DESCRIPTION

Figure 1:
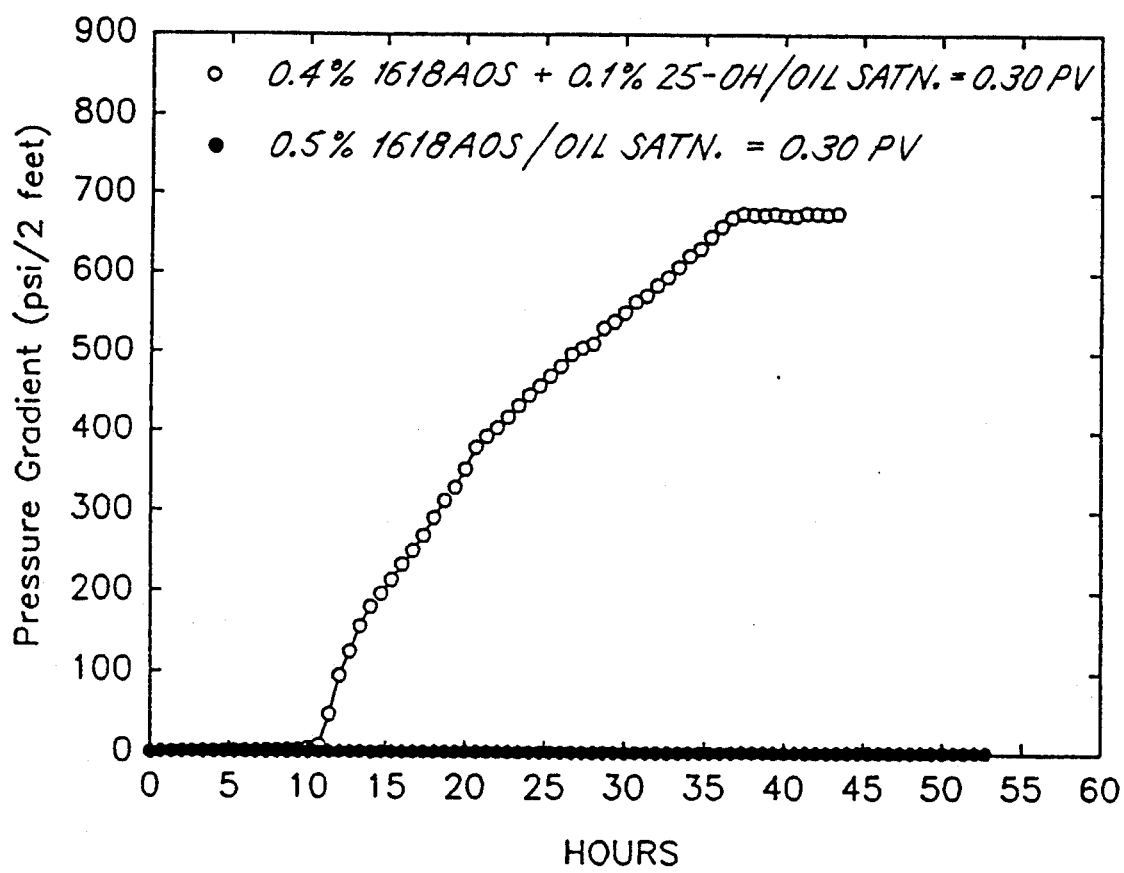
FIG. 1 is a graph illustrating the pressure gradient response of a commercial α-olefin sulfonate steam foaming agent with and without the addition of a blend of linear alcohols having 12 to 15 carbon atoms.

The invention additives for use in conjunction with steam foaming agents or carbon dioxide foaming agents are highly effective in reducing the permeability of flood swept zones. The invention additives increase the foaming capability and diversion capability of steam and carbon dioxide foaming agents. They also permit a number of steam and carbon dioxide foaming agents that do not foam well in the presence of residual oil to form stable foams. Tests have indicated this to be true over a range of residual crude saturation of 7% to 30%. Thus, certain additives that heretofore have been very limited in application may be used to foam in areas having some oil saturation that have not been completely swept by the steam or carbon dioxide flooding medium. Another advantage of using the invention is that the cost of the injected chemicals is significantly lowered because part of the usually expensive surfactant foaming agent is replaced with a low cost alcohol.

The novel additives of the present invention are alcohols having between about 8 and about 20 carbon atoms, preferably about 12 to about 15 carbon atoms. Chain lengths shorter than 8 carbon atoms are known to be less interfacially active. Thus, it is believed that the additive results would not be as good as those alcohols within the invention carbon range of 8 to about 20.

The ratio of surfactant foaming agent to alcohol is chosen such that the aqueous solution remains homogeneous at application temperature, salinity, and pH. Of course, depending upon the individual conditions and the foaming agent employed, the optimum ratio may vary significantly. Once the blend ratio range for homogeneous solutions is defined, the blend ratio should be further optimized within that range to determine what blend gives the fastest foam response under the application conditions. It is believed that the ratio of alcohol to surfactant should be between about 1:6 and about 1:2. general, with a ratio higher than 1:2 of alcohol to surfactant, there is probably not enough surfactant to keep the alcohol solubilized.

It is preferred to maintain the pH of the foaming agent/alcohol solution near neutral, or at least within the pH range of 6 to 10. The preferred solution pH of about 7 is approximately formation water pH for most underground hydrocarbon formations, which eliminates the difficulties of maintaining a different solution pH.

In carbon dioxide injection, however, formation pH will frequently drop as low as 3. Depending on the system, this may create difficulties for the invention method. Although a lower pH and higher brine levels normally associated with carbon dioxide flooded formations will not substantially affect the solubility of alcohol, the pH and salinity will have an effect on how much alcohol the surfactant can solubilize. Under such circumstances, it is believed that the preferred alcohol additives will be in the lower range of alkyl chain length of 8 to 14 carbon atoms.

There are two general classes of foaming agents commercially available for steam foaming and carbon dioxide foaming operations. These are α-olefin sulfonates and alkylaryl sulfonates. In laboratory tests, the alcohol invention additive proved effective with both general types of foaming agents. It is believed that the invention additive method will also prove effective with other types of foaming agents known in the art including various alkoxysulfates, alkoxycarboxylates, and other sulfonates.

U.S. Pat. No. 5,027,898 discusses numerous variations of using steam and carbon dioxide foaming agents that are known in the art. The inventor is unaware of any reason why the invention method would inhibit the use of any of these variations in using steam and carbon dioxide foaming agents or why these variations would inhibit the use of the invention method.

The following examples will further illustrate the novel alcohol additive method of the present invention for steam and carbon dioxide foaming agents. These examples are given by way of illustration and not as limitations on the scope of the invention. Thus, it should be understood that the composition and concentration of the additives may be varied to achieve similar results within the scope of the invention.

EXAMPLES

FIG. 1 illustrates the pressure gradient response obtained when a 0.5% by weight 16 to 18 carbon atom α-olefin sodium sulfonate (1618AOS) in Kern River softened water with a pH of 7 was injected with nitrogen gas at 150° C. into a sandpack. The nitrogen gas and surfactant had a superficial velocity of 10 meters per day in the 2 foot by 1.5 inch, 6 Darcy linear sandpack. The sandpack contained 0.30 pore volumes of heavy California crude, about 0.42 pore volumes of Kern River softened water and about 0.28 pore volumes of nitrogen. The Kern River softened water is relatively fresh, containing about 800 ppm Total Dissolved Solids (TDS) which includes about 320 ppm sodium chloride, about 320 ppm sodium bicarbonate, and about 160 ppm sodium sulfate.

No substantial pressure gradient was observed after injecting the surfactant and nitrogen for about 24 hours. This is noted as a solid line at the bottom of FIG. 1. These results indicated that the ability of this surfactant to generate foam was severely hindered by the presence of oil.

FIG. 1 also shows the pressure gradient response obtained when 20% of the α-olefin sulfonate was replaced with a commercial blend of linear alcohols having 12 to 15 carbon atoms sold under the trademark "NEODOL 25" by Shell Chemical Co. (25-OH). Thus, the solution contained 0.4% of the α-olefin sulfonate and 0.1% alcohol by weight. All other experimental conditions were identical. A rapid pressure gradient response was observed along with the attainment of a large steady state pressure gradient of nearly 700 psig. These results indicate that the surfactant/alcohol blend can generate substantial quantities of strong foam in the presence of crude oil.

Figure 2:
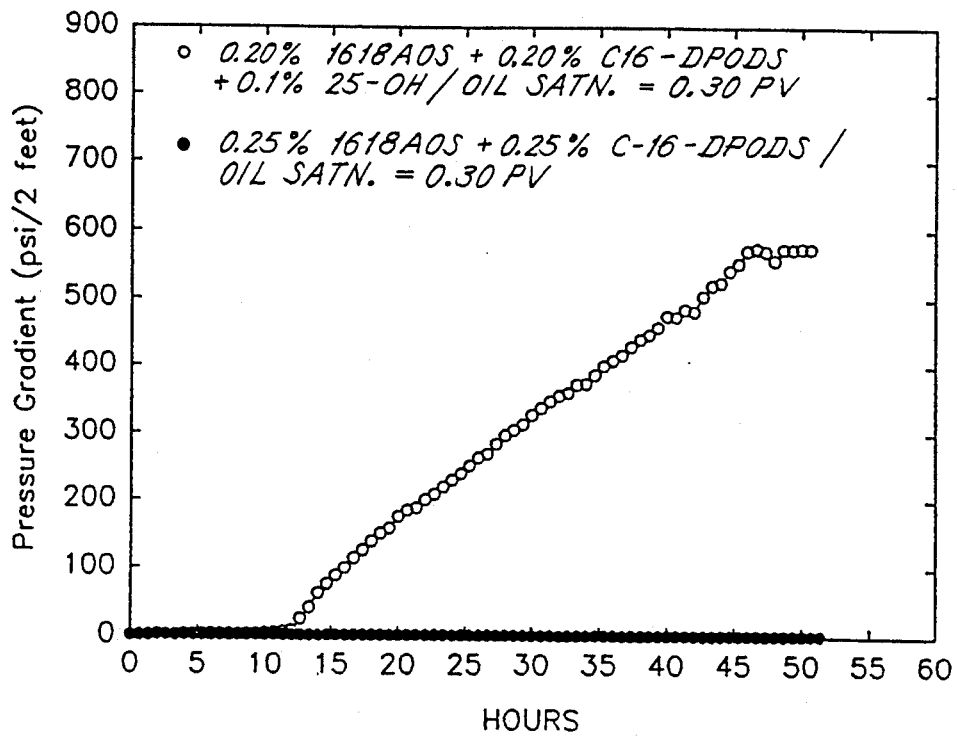
FIG. 2 is a graph illustrating the pressure gradient response of a commercial α-olefin sulfate and a disulfonate steam foaming agent with and without the addition of a blend of linear alcohols having 12 to 15 carbon atoms.

FIG. 2 illustrates the pressure gradient response obtained when a blend of 25% by weight 16 to 18 carbon atom α-olefin sodium sulfonate and 0.25% sodium diphenyl oxide disulfonate (C-16DPODS) was injected into a sandpack under the same conditions as FIG. 1.

No substantial pressure gradient was observed after injecting the surfactant blend and nitrogen for over 50 hours. The ability of this surfactant blend to generate a foam is severely hindered by the presence of oil. Under identical conditions, the surfactant blend generated pressure gradients of up to 600 psig when 20% of the surfactant blend was replaced with "NEODOL 25" to create a 0.2% α-olefin sulfonate, 0.2% diphenyl oxide disulfonate, and 0.1% by weight "NEODOL 25" solution. These results indicate that alcohols employed according to the invention can enhance the performance of foaming surfactants in the presence of crude oil for steam foaming operations.

Figure 3:
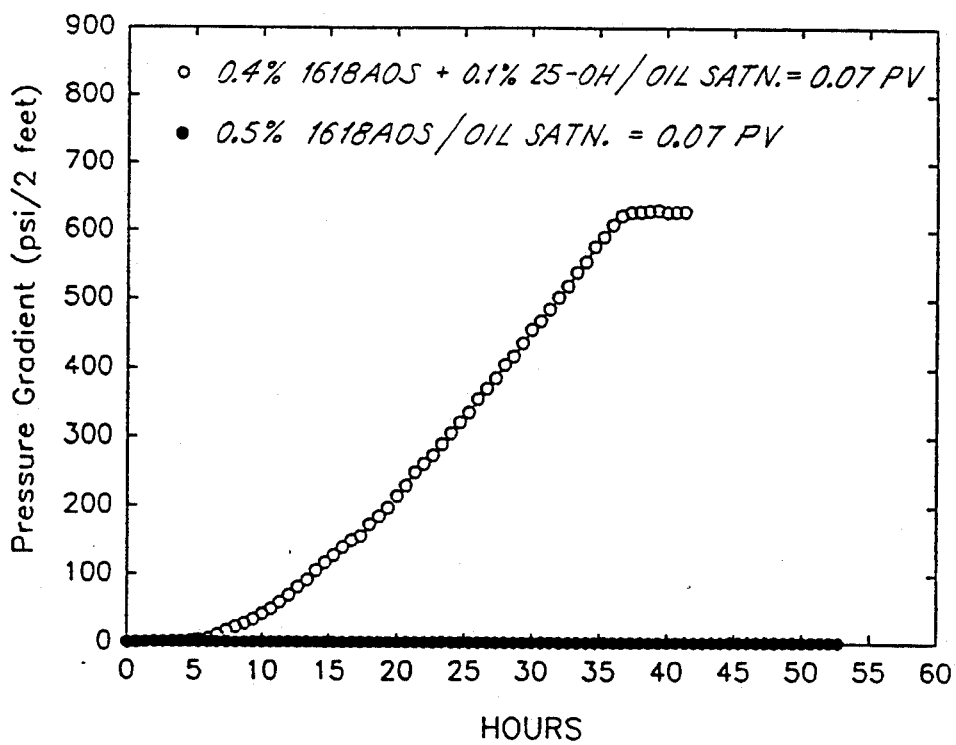
FIG. 3 is a graph illustrating the pressure gradient response of the FIG. 1 system in the presence of 0.07 pore volumes of oil.

FIG. 3 illustrates the pressure gradient responses of the FIG. 1 system under FIG. 1 conditions except that the amount of heavy California crude oil in the sandpack was reduced from 0.3 pore volumes to 0.07 pore volumes, and the other components within the sandpack were increased to 0.56 pore volumes of Kern River softened water and 0.38 pore volumes of nitrogen.

No substantial pressure gradient was observed after injecting surfactant and nitrogen for over 50 hours. But when 20% of the α-olefin sulfonate was replaced with the "NEODOL 25" alcohol resulting in a 0.4% α-olefin sulfonate and 0.1% "NEODOL 25" solution, a rapid pressure gradient was observed, and a large steady-state pressure gradient of over 600 psig was achieved.

Many other variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. In a steam flood or carbon dioxide flood in an underground hydrocarbon formation, wherein a surfactant foaming solution is injected to foam and reduce the permeability of swept zones, forcing steam or carbon dioxide into unswept zones, the improvement which comprises:

adding a long chain alcohol having about 8 to about 20 carbon atoms to the surfactant foaming solution in a concentration such that the ratio of alcohol to surfactant in the foaming solution is between about 1:6 and about 1:2.

2. The improvement of claim 1, wherein the alcohol is an unsaturated linear alcohol.

3. The improvement of claim 2, wherein the alcohol has about 12 to about 15 carbon atoms.

4. The improvement of claim 1, wherein the alcohol is a saturated linear alcohol.

5. The improvement in claim 1, wherein the surfactant is an α-olefin sulfonate.

6. The improvement in claim 1, wherein the surfactant is an alkylaryl sulfonate.

7. In a steam flood in an underground hydrocarbon formation, wherein a surfactant foaming solution is injected to foam and reduce the permeability of swept zones, forcing steam into unswept zones, the improvement which comprises:

adding a linear alcohol having about 12 to about 15 carbon atoms to the surfactant foaming solution in a concentration such that the ratio of alcohol to surfactant in the foaming solution is between about 1:6 and about 1:2.

8. In a carbon dioxide flood in an underground hydrocarbon formation, wherein a surfactant foaming solution is injected to foam and reduce the permeability of swept zones, forcing carbon dioxide into unswept zones, the improvement which comprises:

adding a linear alcohol having about 12 to about 15 carbon atoms to the surfactant foaming solution in a concentration such that the ratio of alcohol to surfactant in the foaming solution is between about 1:6 and about 1:2.

* * * * *